United States Patent
Mullender et al.

(10) Patent No.: US 8,511,095 B2
(45) Date of Patent: Aug. 20, 2013

(54) FLOW DISCHARGE DEVICE

(75) Inventors: Andrew J. Mullender, Nottingham (GB); Brian A. Handley, Derby (GB); Zahid M. Hussain, Derby (GB)

(73) Assignee: Rolls-Royce PLC., London (GB)

( * ) Notice: Subject to any disclaimer, the term of this patent is extended or adjusted under 35 U.S.C. 154(b) by 429 days.

(21) Appl. No.: 12/822,705

(22) Filed: Jun. 24, 2010

(65) Prior Publication Data

US 2011/0011477 A1    Jan. 20, 2011

(30) Foreign Application Priority Data

Jul. 14, 2009 (GB) .................................. 0912171.6

(51) Int. Cl.
*F02C 6/04* (2006.01)
*F02C 6/08* (2006.01)
*G05D 11/00* (2006.01)
*F16K 1/30* (2006.01)

(52) U.S. Cl.
USPC ............. 60/785; 60/782; 137/114; 137/614.2

(58) Field of Classification Search
USPC ..................... 60/39.5, 39.52, 226.1, 228, 229, 60/262, 725, 782, 785, 795; 114/288, 289; 137/516.11, 605, 625.3, 896, 375, 496, 497, 137/498, 114, 614.2; 181/210, 211, 212, 181/213, 215, 219, 220, 233; 244/130, 204, 244/204.1
See application file for complete search history.

(56) References Cited

U.S. PATENT DOCUMENTS

| | | | | |
|---|---|---|---|---|
| 2,206,356 | A * | 7/1940 | Hutchings | 137/515.7 |
| 2,657,899 | A * | 11/1953 | Liebe et al. | 137/516.11 |
| 3,125,119 | A * | 3/1964 | Richgels | 137/538 |
| 3,202,177 | A * | 8/1965 | Klein et al. | 137/514.7 |
| 3,234,959 | A * | 2/1966 | Feinberg | 137/494 |
| 3,540,484 | A * | 11/1970 | Brown et al. | 138/43 |
| 3,943,969 | A * | 3/1976 | Rubin et al. | 137/538 |
| 4,103,702 | A * | 8/1978 | Duthion et al. | 137/375 |
| 4,113,050 | A * | 9/1978 | Smith | 181/230 |
| 4,537,277 | A * | 8/1985 | Bryce | 181/214 |
| 5,014,746 | A * | 5/1991 | Heymann | 137/625.3 |
| 5,441,431 | A * | 8/1995 | Brogdon | 440/88 R |
| 5,477,673 | A * | 12/1995 | Blais et al. | 60/785 |
| 6,122,905 | A * | 9/2000 | Liu | 60/785 |
| 6,565,313 | B2 * | 5/2003 | Nikkanen et al. | 415/144 |

(Continued)

OTHER PUBLICATIONS

"The Jet Engine," Rolls-Royce, 2005, pp. 79-80, 6th Ed.

(Continued)

*Primary Examiner* — Stephen M Hepperle
*Assistant Examiner* — Frederick D Soski
(74) *Attorney, Agent, or Firm* — Oliff & Berridge, PLC.

(57) ABSTRACT

A flow discharge device, such as a bleed assembly in a gas turbine engine, comprises a discharge outlet member having a skirt which is accommodated telescopically in a housing so as to be displaceable with respect to wall of a duct from a retracted position in which slots in the skirt lie outside the duct, and an extended position in which the slots open into the duct for the discharge of a secondary fluid into the flow in the duct. The discharge outlet member is moved to the extended position by the pressure of the secondary fluid acting on a silencer element. A spring returns the discharge outlet member to the retracted position when the flow of the secondary fluid is terminated.

12 Claims, 3 Drawing Sheets

(56) References Cited

U.S. PATENT DOCUMENTS

| | | | |
|---|---|---|---|
| 7,434,405 B2 | 10/2008 | Gukeisen et al. | |
| 7,438,131 B2* | 10/2008 | Weirich | 166/326 |
| 2002/0189263 A1* | 12/2002 | Rayer et al. | 60/782 |
| 2003/0070870 A1* | 4/2003 | Reynolds | 181/230 |
| 2005/0067218 A1* | 3/2005 | Bristow et al. | 181/237 |
| 2006/0207259 A1* | 9/2006 | Holt et al. | 60/772 |
| 2006/0266051 A1* | 11/2006 | Gukeisen et al. | 60/785 |
| 2007/0089429 A1* | 4/2007 | Makuszewski | 60/785 |
| 2007/0234738 A1* | 10/2007 | Borcea | 60/785 |
| 2007/0261410 A1* | 11/2007 | Frank et al. | 60/785 |
| 2008/0016878 A1* | 1/2008 | Kirby | 60/782 |
| 2008/0050218 A1* | 2/2008 | Sokhey | 415/119 |
| 2008/0053105 A1* | 3/2008 | Appleby et al. | 60/785 |
| 2008/0073167 A1* | 3/2008 | Youd et al. | 188/378 |

OTHER PUBLICATIONS

Search Report issued in British Patent Application No. 0912171.6, on Nov. 5, 2009.

* cited by examiner

FLOW DISCHARGE DEVICE

This invention relates to a flow discharge device in a duct, and is particularly, although not exclusively, concerned with such a device for discharging compressor bleed air into a bypass duct of a gas turbine engine.

When a gas turbine engine is operating under transient conditions, for example when decelerating, it may be necessary to bleed air at high pressure from the core gas flow through the engine. Such air may be discharged through a discharge device into a bypass flow within the engine. Bleed valves are provided to control the discharge of air. The flow of bleed air from the core gas flow into the bypass flow takes place over a substantial pressure drop, and can generate significant noise. It is therefore usual for the discharge device to be configured so as to reduce the noise. A typical measure is to discharge the bleed air into the bypass duct through a perforated plate, sometimes referred to as a "pepper pot" which is flush with the wall of the bypass duct. The pepper pot serves to break the single body of air flowing towards the bypass duct into a large number of smaller jets which promote small-scale turbulence and hence quicker mixing with the main flow through the bypass duct.

The individual flow jets from the pepper pot holes tend to coalesce into a single plume, and consequently the bleed flow does not mix rapidly with the main flow. The plume also blocks the main flow and creates a wake behind it. If the pepper pot is flush with the wall of the bypass duct hot air and high-energy vortices in the wake can flow into contact with the bypass duct surfaces creating "hot spots" where components can be overheated and consequently damaged.

U.S. Pat. No. 7,434,405 discloses a bleed diffuser for a gas turbine engine which is extendable so as to project beyond a wall of the gas turbine engine into an air flow, when air is to be discharged from the bleed diffuser. Extension of the bleed diffuser is achieved by means of an actuator such as an electrical motor. Bleed diffusers need to be deployed rapidly, for relatively short periods, and consequently a large and powerful actuator is required. Also, the control of the actuator has to be coordinated with that of the rest of the bleed system, introducing complexity and reliability issues.

According to the present invention there is provided a flow discharge device for discharging flow into a duct, the device comprising a discharge outlet member having at least one discharge aperture, the outlet member being displaceable by the pressure of a secondary fluid in a secondary fluid source from a retracted position in which the discharge aperture is situated outside the duct, to an extended position in which the discharge aperture is situated within the duct, whereby the secondary fluid flow is discharged through the aperture into a main fluid flow travelling along the duct.

The present invention thus enables the discharge outlet member to be moved automatically into the extended position by the pressure of the secondary fluid, without requiring any additional control systems or actuators.

The discharge outlet member may be mounted displaceably in a housing which is secured with respect to a wall of the duct. The housing may be provided with a bleed valve which, when open, provides communication between the interior of the housing and the secondary fluid source.

The discharge outlet member may comprise an end wall and a skirt which extends from the end wall and telescopically engages the housing, the aperture being provided in the skirt. In the retracted position of the discharge outlet member, the end wall may lie substantially flush with the duct wall. The aperture may be one of an array of apertures which permit the flow of the secondary fluid from the interior of the skirt to the duct when the discharge outlet member is in the extended position. The aperture, or at least one of the apertures, may be in the form of a slot.

A silencer element may be disposed in the skirt at a position away from the end wall, the secondary fluid acting on the silencer element to displace the outlet member to the extended position.

Return means may be provided for returning the discharge outlet member to the retracted position when isolated from the secondary fluid source. The return means may be resilient means, for example a spring acting between the silencer element and an abutment which is secured with respect to the housing. A damping means may be provided for damping displacement of the discharge outlet member towards the retracted and/or extended positions.

The present invention also provides a gas turbine engine provided with a flow discharge device as defined above, the duct being a bypass duct of the gas turbine engine, and the discharge device comprising a compressor bleed assembly.

For a better understanding of the present invention, and to show more clearly how it may be carried into effect, reference will now be made, by way of example, to the accompanying drawings, in which.

Figure 1:
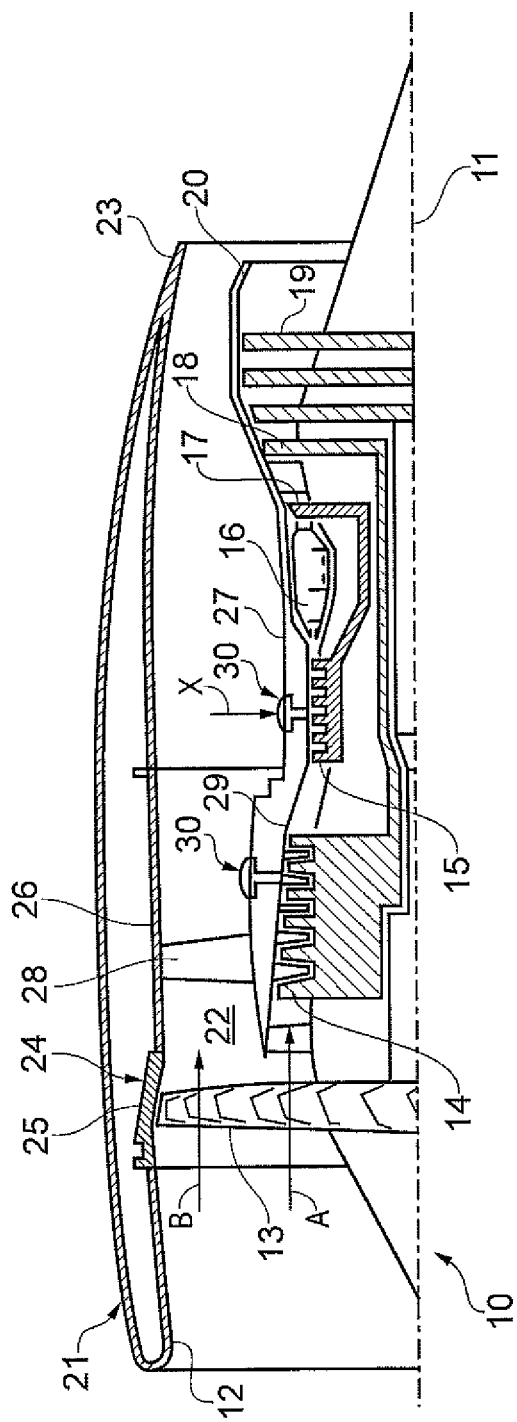
FIG. 1 is a schematic sectional view of a gas turbine engine.
Figure 2:
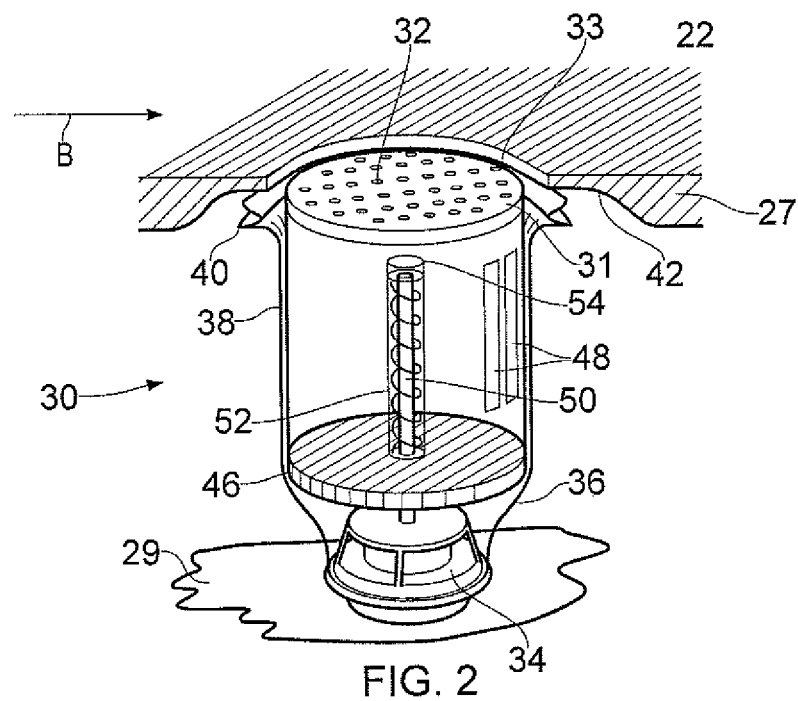
FIG. 2 shows a bleed assembly of the engine of FIG. 1 in a retracted condition.
Figure 3:
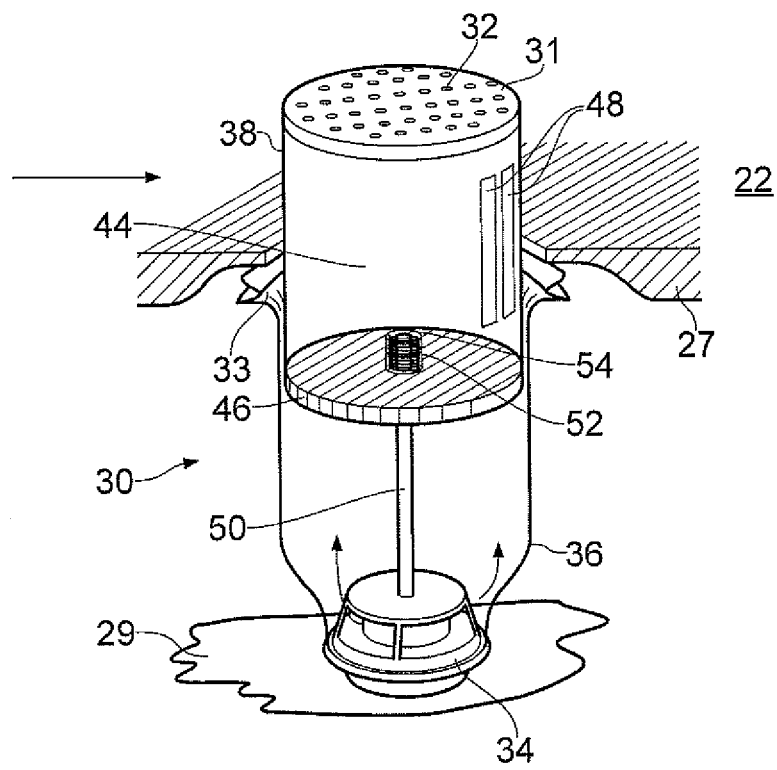
Figures 4, 5, 6:
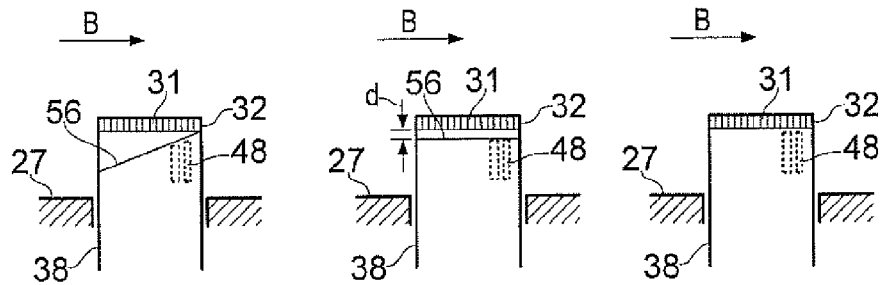
Figure 7:
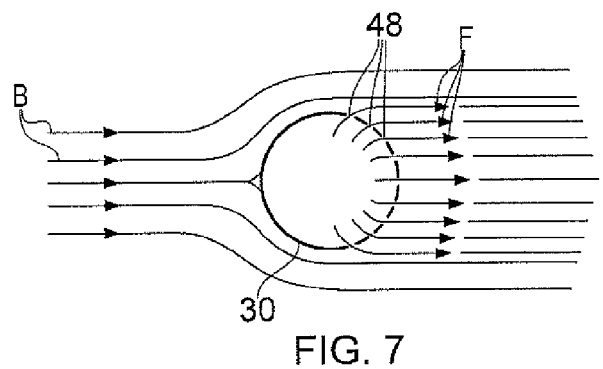
Figure 8:
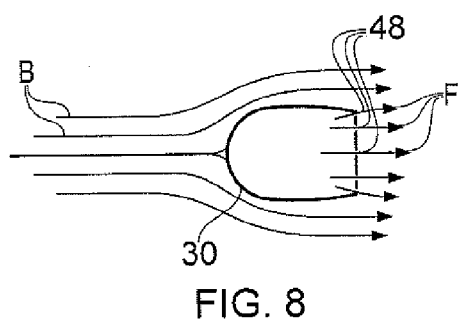

FIG. 3 corresponds to FIG. 2 but shows the bleed assembly in an extended condition;

FIGS. 4 to 6 show three variants of the bleed assembly of FIGS. 1 and 2; and FIGS. 7 and 8 represent air flow patterns generated in use of two embodiments of the bleed valve assembly.

Referring to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 12 is accelerated by the fan 13 to produce two air flows: a first airflow A into the intermediate pressure compressor 14 and a second airflow B which passes through the bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive, the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The fan 13 is circumferentially surrounded by a structural member in the form of a fan casing 24, which is supported by an annular array of outlet guide vanes 28. The fan casing 24 comprises a rigid containment casing 25 and attached inwardly thereto is a rear fan casing 26. The bypass duct 22 is defined between the rear fan casing 26 and an inner wall 27. The inner wall 27 is spaced outwardly from a compressor casing structure 29 which accommodates the intermediate and high pressure compressors 14, 15.

During engine operation and particularly when changing rotational speed at low power it is important to ensure that the pressure ratio across each compressor 14, 15 remains below a critical working point, otherwise the engine 10 can surge and hence flow through the engine 10 may break down. This can cause damage to engine's components as well as aircraft handling problems.

To maintain a preferred pressure difference across a compressor 14, 15, or even just one stage of a compressor 14, 15, bleed assemblies 30 are provided to release pressure from an upstream part of a compressor 14, 15. Operation of a bleed assembly 30 and engine operability are described in "The Jet Engine" 6th Edition, 2005, Rolls-Royce plc, pages 79-80, and details of such operation will therefore only be briefly mentioned herein.

The bleed assembly 30 comprises a bleed valve 34 which communicates at one end with the respective compressor 14, 15 through the casing structure 29 and is connected at its other end to a housing 36. A discharge outlet member 38 is mounted within the housing 36.

The housing 36 is supported between the inner wall 27 of the bypass duct 22, and the casing structure 29. A fire seal 40 carried by an out-turned flange of the housing 36, contacts the radially inner surface of the inner wall 27, at a recess 42 surrounding the opening 33.

The housing 36 is of cylindrical form, but narrows to a reduced diameter at its radially inner end, where the bleed valve 34 is situated. The bleed valve 34 is received in an opening in the casing structure 29 so that its lower end (in the orientation shown in FIG. 2) is exposed to the air flow in the compressor 14, 15, which constitutes a source of a secondary fluid, as will be discussed below. The housing 36 thus serves as a bleed duct providing communication between the compressor 14, 15 and the bypass duct 22 when the bleed valve 34 is open.

The upper region of the bleed valve 34 opens within the interior of the housing 36. The discharge outlet member 38 comprises an end wall 32 and a depending skirt 44 (FIG. 3). The end wall 32 is provided with an acoustic liner 31 facing into the bypass duct 22. A similar acoustic liner may be provided on the inner wall 27. The depending skirt 44 forms a telescopic fit within the housing 36 and, at its lower end (in the orientation shown in FIG. 2), is provided with a silencer element 46 having a cellular structure, so that air flow through the silencer element follows a tortuous path. This creates a significant pressure drop, with associated noise attenuation, when flow takes place across the silencer element 46.

The skirt 44 is provided with an array of apertures 48 which, in the embodiment shown in FIGS. 2 and 3, comprise slots extending in the axial direction of the skirt. The slots 48 are disposed on the downstream side of the skirt 44, with respect to the flow direction B in the bypass duct 22.

A rod 50 projects into the housing 36, and into the skirt 44, from the bleed valve 34. A spring and damper unit 52, represented diagrammatically in FIGS. 2 and 3, acts between the silencer element and an abutment, in the form of a projecting flange 54, at the free end of the rod 50.

In operation of the engine shown in FIG. 1, parts of the core engine air flow A may be diverted through the bleed assembly 30 in order to optimise the performance of the respective compressors 14, 15. This is achieved by opening the bleed valve 34 of the respective bleed assembly 30. The open bleed valve 34 permits air at high pressure to pass through the casing structure 29 into the housing 36. Although the introduced air can pass through the silencer element 46, a pressure drop is nevertheless established across the silencer element 46, which displaces it away from the bleed valve 34 against the resilience of the spring in the spring/damper unit 52. The entire discharge outlet member 38 is thus displaced from the retracted condition shown in FIG. 2 to the extended position shown in FIG. 3, in which the end wall 32 is situated away from the inner wall 27. Consequently, air from the compressor 14, 15 flowing through the bleed valve 34 passes across the silencer element 46 into the discharge outlet member 38 and thence, through the slots 48, into the bypass flow B in the bypass duct 22. The lower ends of the slots 48 are spaced above the inner wall 27, and so the relatively hot discharging flow from the discharge outlet member 38 enters the bypass flow B away from the inner and outer walls 26, 27, and consequently is able to mix with the cooler bypass flow B before contact with the inner and outer walls 26, 27, so avoiding direct impingement of the hot bleed air flow with the surfaces of the walls 26, 27.

When the bleed valve 34 is closed, the interior of the housing 36 is isolated from the compressor 14, 15, so the pressure drop across the silencer element 46 reduces. The spring in the spring/damper unit 52 then drives the discharge outlet member 38 to the retracted position as shown in FIG. 2.

FIGS. 4 to 6 show three variants of the discharge outlet member 38. In all three variants, the discharge outlet member 38 serves as a noise attenuator, and so mitigates the interruption in the acoustic material of the inner wall 27 at the opening 33. This is achieved by the acoustic liner 31 of open cellular form on the end wall 32, with the size and disposition of the cells being optimised for noise attenuation. In the embodiments of FIGS. 4 and 5, a pressure diaphragm 56 is situated within the discharge outlet member 38 a short distance beneath the end wall 32. The pressure diaphragm serves to direct air flow from the bleed valve 34 to the slots 48 in a desired manner. In the embodiment of FIG. 4, the pressure diaphragm is oblique to the transverse plane of the discharge outlet member 38, assisting the change of direction of the air flow towards the slots 48. In the variant of FIG. 5, the pressure diaphragm is parallel to the transverse plane (and consequently to the end wall 32), and is spaced below the end wall 32 by a distance d to avoid turbulent flow in the region of the discharge outlet member 38 above the slots 48. In both of the variants of FIGS. 4 and 5, the pressure diaphragm 56 is situated between the end wall 32 and the slots 48.

The openings such as the slots 48 in the skirt 44 may be arranged in any suitable manner to achieve a desired discharge plume from the discharge outlet member 38 when deployed. For example, the slots 48 may be replaced, or supplemented, by small holes on the upstream, downstream or side regions of the skirt 44.

The pressure diaphragm 56 may be dispensed with in some circumstances, as shown in FIG. 6.

FIG. 7 represents streamlines of the flow B when combined with flow F discharged by the bleed assembly 30 through the slots 48. FIG. 7 shows a bleed assembly 30 having a circular cross-sectional shape, in accordance with FIGS. 2 and 3. However, as indicated in FIG. 8, the profile of the bleed assembly, and in particular the discharge outlet member 38, may be tailored to suit the aerodynamic requirements of the bypass duct 22. Thus, in the embodiment shown in FIG. 8, the discharge outlet member 38 has a rounded leading surface 58 directed upstream with respect to the bleed flow B, and a flat, transverse downstream surface 16 in which the slots 48 are provided.

A bleed assembly as described above provides minimal drag on the bypass flow B when the discharge outlet member 38 is retracted, as shown in FIG. 2, because the end wall 32 lies substantially flush with the surrounding inner wall 27. Furthermore, because the end wall 32 is provided with the acoustic liner 31, there is a minimal loss of the acoustic properties of the liner of the inner wall 27. By deploying the discharge outlet member 38 into the bypass flow B, the discharge of the hot air from the compressors 14, 15 takes place away from the inner and outer walls 26, 27. This feature, in conjunction with appropriate tailoring of the efflux from the slots 48 or other openings, avoids impingement on the inner and outer walls 26, 27 of the hot bypass air.

Because the deployment of the discharge outlet member 38 is achieved by the high-pressure air passing through the bleed valve 34, high reliability can be assured, with deployment occurring only when the bleed valve 34 is open.

The invention claimed is:

1. A gas turbine engine provided with a flow discharge device comprising a compressor bleed assembly for discharging flow into a bypass duct of the gas turbine engine, the device comprising:
    a discharge outlet member having at least one discharge aperture,
    the discharge outlet member being mounted displaceably in a housing secured with respect to the wall of the duct,
    the housing having a valve located separate from the discharge aperture which is openable to provide communication between the interior of the discharge outlet member and a secondary fluid source and where further
    the discharge outlet member is displaceable by the pressure of a secondary fluid in the secondary fluid source from a retracted position in which the discharge aperture is situated outside the duct, to an extended position in which the discharge aperture is situated within the duct, whereby the secondary fluid flow is discharged through the aperture into a main fluid flow travelling along the duct.

2. A gas turbine engine as claimed in claim 1, in which the discharge outlet member comprises an end wall, and a skirt which extends from the end wall and telescopically engages the housing.

3. A gas turbine engine as claimed in claim 2, in which the end wall is provided with an acoustic liner.

4. A gas turbine engine as claimed in claim 2, in which the or each discharge aperture is provided in the skirt.

5. A gas turbine engine as claimed in claim 4, in which the discharge aperture is one of an array of discharge apertures provided in the skirt.

6. A gas turbine engine as claimed in claim 4, in which the discharge aperture, or at least one of the discharge apertures, comprises a slot.

7. A gas turbine engine as claimed in claim 2, in which a silencer element is disposed in the skirt at a position away from the end wall, the secondary fluid acting on the silencer element to displace the outlet member to the extended position.

8. A gas turbine engine as claimed in claim 1, in which return means is provided for returning the discharge outlet member to the retracted position when the discharge outlet member is isolated from the secondary fluid source.

9. A gas turbine engine as claimed in claim 8, in which the return means comprises resilient means.

10. A gas turbine engine as claimed in claim 9, in which the resilient means comprises a spring acting between the silencer element and an abutment which is secured with respect to the housing.

11. A gas turbine engine as claimed in claim 8, in which a damping means is provided for damping displacement of the discharge outlet member towards at least one of the retracted and extended positions.

12. A flow discharge device for discharging flow into a duct, the device comprising:
    a discharge outlet member having at least one discharge aperture,
    the discharge outlet member being displaceable by a pressure of a secondary fluid in a secondary fluid source from a retracted position in which the discharge aperture is situated outside the duct, to an extended position in which the discharge aperture is situated within the duct,
    whereby the secondary fluid flow is discharged through the aperture into a main fluid flow travelling along the duct,
    the discharge outlet member being mounted displaceably in a housing secured with respect to the wall of the duct, and
    the discharge outlet member having an end wall, and a skirt which extends from the end wall and telescopically engages the housing,
    wherein a silencer element is disposed in the skirt at a position away from the end wall and the secondary fluid flows through the silencer element to displace the silencer element and the discharge outlet member to the extended position.

* * * * *